G. W. PRIEST.
CONTRACTING CORE FOR CEMENT LINED PIPE.
APPLICATION FILED JUNE 13, 1910.

1,171,641.

Patented Feb. 15, 1916.
2 SHEETS—SHEET 1.

Witnesses:
H. B. Davis
Harriot A. Best

Inventor:
George W. Priest
by Hayes & Harriman
Attys.

G. W. PRIEST.
CONTRACTING CORE FOR CEMENT LINED PIPE.
APPLICATION FILED JUNE 13, 1910.
1,171,641.
Patented Feb. 15, 1916.
2 SHEETS—SHEET 2.
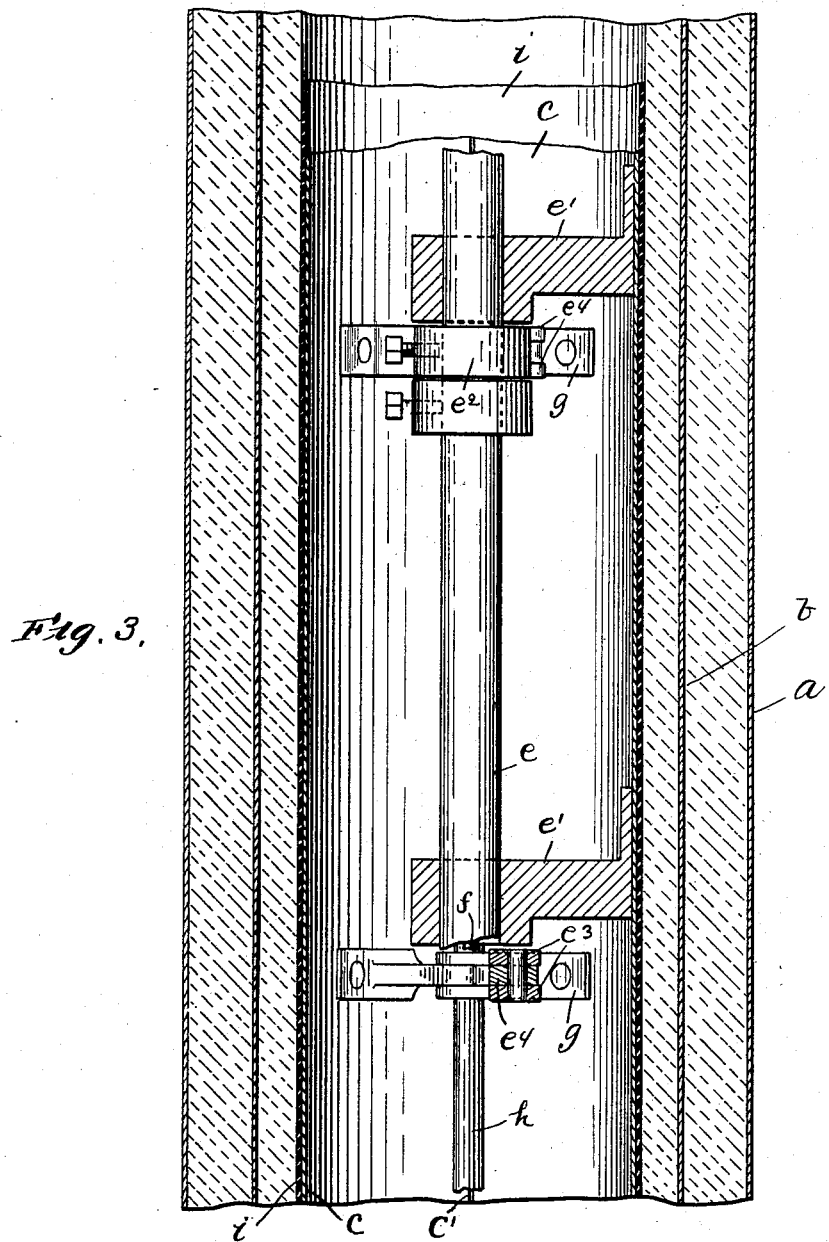
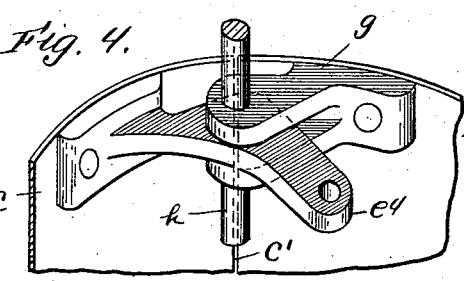

UNITED STATES PATENT OFFICE.

GEORGE W. PRIEST, OF NEWTON, MASSACHUSETTS.

CONTRACTING CORE FOR CEMENT-LINED PIPE.

1,171,641.  Specification of Letters Patent.  Patented Feb. 15, 1916.

Application filed June 13, 1910. Serial No. 566,507.

*To all whom it may concern:*

Be it known that I, GEORGE W. PRIEST, residing at Newton, in the county of Middlesex and State of Massachusetts, have invented an Improvement in Contracting Cores for Cement-Lined Pipe, of which the following is a specification.

This invention relates to a contracting core, especially adapted for use in molding cement-lined pipe. In lining pipe with cement much difficulty is experienced in forming the lining with a smooth surface. Cores of various kinds have been employed, but if the core is withdrawn before the cement has hardened the lining is liable to be formed out of true, and more or less broken and rough, and if the core remains until the cement has hardened then it can only be removed with the greatest difficulty and with the liability of cracking or otherwise injuring the lining.

Collapsible cores have been made in various ways for various purposes, but, so far as I am aware, they have not been constructed so that when withdrawn from a pipe, the lining formed therein will be truly concentric with the pipe and will have a smooth surface.

This invention has for its object the construction of a contracting core for a cement-lined pipe which when expanded will present a smooth continuous surface and which may be contracted for the purpose of withdrawal, and also the provision of a flexible sheath adapted to inclose the contracting core which is made as a continuous tube of rubber or canvas or some equivalent flexible or elastic material which will not be affected by the alkali contained in the cement composing the lining of the pipe, and of a size corresponding to the size of the expanded core or thereabout, so as to be held taut by said expanded core to present a smooth unbroken or continuous surface for the engagement therewith of the lining of the pipe.

I prefer to employ a rubber sheath for the reason that it is easy to handle and is not only yielding but elastic, so that when the core is expanded it may be stretched to thereby insure a smooth continuous surface, and also may be withdrawn from the lined pipe by reversing it or turning it inside out, so that it may be peeled off of the cement lining as contrasted to being drawn off by a sliding movement.

Figure 1:
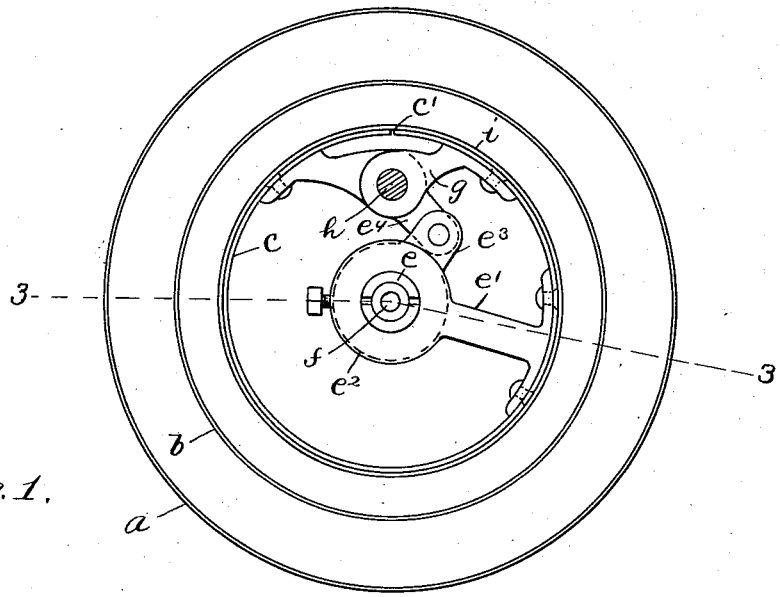
Figure 2:
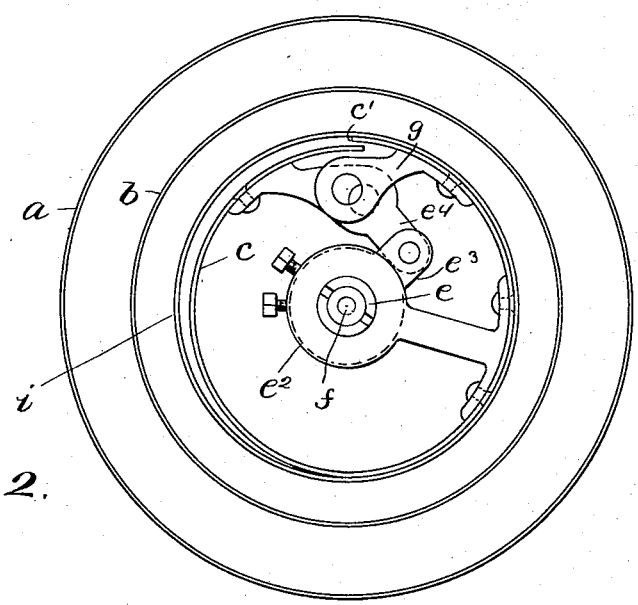

Figure 1 is a plan view of a contracting core for a cement-lined pipe embodying this invention, the parts being in the position they will occupy when the core is expanded in the pipe. Fig. 2 is a similar view showing the parts collapsed. Fig. 3 is a longitudinal vertical section of a portion of the contracting core. Fig. 4 is a detail to be referred to.

As represented in the drawing the pipe to be lined with cement is composed of two sheet metal pipes $a$, and $b$, with cement arranged between them and also on the inside of the inner pipe $b$, but so far as my invention is concerned the pipe to be lined with cement may be of any well known or suitable construction.

$c$ represents a contracting tubular, cylindrical shell of sheet metal, hence is quite thin. It is made of any suitable length to extend from end to end of the pipe to be lined, and corresponds in shape to the lining to be formed in the pipe. It is slitted from end to end, as at $c'$.

As a means for contracting and expanding the slitted shell I have herein provided a central shaft $e$, made tubular to provide for a tie-rod $f$, which may be extended through it, and said shaft is supported by brackets $e'$ which are attached to the inside of the shell and extend inward toward the center thereof. Said shaft has rigidly secured to it at such point or points as may be desired, collars $e^2$, having short arms $e^3$, extended from them, and the extremities of said arms are loosely connected with short arms $e^4$, see Fig. 4, which are attached to the inside of the shell. The arms $e^4$ are arranged at one side of the slit, and the brackets $e'$ at the other side thereof, so that as the shaft is turned, the walls of the shell at opposite sides of the slit are moved toward and from each other for the purpose of contracting and expanding the shell. Locking-devices are provided for locking the actuating-means thus described when the shell is expanded, and, as here shown, said locking-devices consist of short arms $g$ attached to the inside of the shell, at that side of the slit opposite the points of attachment of the arms $e^4$, which extend over said arms $e^4$, and said arms $g$ have vertical holes through them which are adapted to register with corresponding holes in the arms $e^4$ when the shell is expanded, and when so disposed relative to each other, an upright rod $h$ is passed through the holes in said arms $g$ and $e^4$ which secures them together.

The actuating-means here shown is simple and effective and so also are the locking-devices, but my invention is not limited in all particulars to the particular construction here shown of said means and devices.

For assisting in forming the lining truly concentric to the pipe, and giving it a smooth surface when hardened, I have provided a flexible sheath $i$, preferably composed of rubber, or it may be made of canvas or some equivalent flexible or elastic material. Said sheath is made as a tube, which is continuous and unbroken throughout its length, and of a size to correspond to the size of the inner face of the lining; and said sheath is adapted to be drawn onto the contracted shell, and when said shell is expanded to be tightly stretched so as to present a smooth continuous surface for the lining. As an easy way of drawing the flexible or elastic sheath onto the core, even though said core is contracted, one end of the sheath may be brought into engagement with one end of the core, and then the sheath may be reversed or turned inside out, and thus drawn onto the core. But this characteristic feature of the sheath is of much more importance when being withdrawn from the lined pipe, as it admits of its being peeled off of the cement lining as contrasted to being drawn up by a sliding movement.

It is intended that the core herein described shall remain in the cement-lined pipe until the cement has hardened, or at least has become so firmly set that it is self-supporting, then the core is contracted and withdrawn and then the sheath is withdrawn by reversing it.

The sheath does not adhere to the lining, and as it has a continuous smooth unbroken surface, the surface of the lining is likewise formed, and also has a very good finish not otherwise obtainable so far as I am aware.

I claim:—

1. A contracting core for cement-lined pipe comprising a sheet-metal shell, slitted from end to end, a center-shaft, brackets arranged on the interior of the shell for supporting said shaft, arms extended from said shaft, and arms also secured to the interior of the shell which are loosely connected with the arms on the shaft, to be moved by rotation of said shaft to expand and contract the shell, said arms on the shell having holes through them, and other arms secured to the shell adapted to extend over the aforesaid arms, having holes through them which register with the holes in the aforesaid arms when the shell is expanded and a rod extended through the holes in said arms for locking them, substantially as described.

2. An expansible core for cement lined pipes including a sectional shell, means for operating the shell to form the same into a true cylindrical, or into a body partly collapsed, and a flexible sheath adapted to be operated with and by the shell to present an unbroken smooth molding surface to the exterior of the shell.

In testimony whereof, I have signed my name to this specification, in the presence of two subscribing witnesses.

GEORGE W. PRIEST.

Witnesses:
 B. J. NOYES,
 H. B. DAVIS.

Copies of this patent may be obtained for five cents each, by addressing the "Commissioner of Patents, Washington, D. C."